United States Patent
Tsujiyama et al.

(10) Patent No.: US 7,700,504 B2
(45) Date of Patent: Apr. 20, 2010

(54) ELASTIC NONWOVEN FABRIC AND FIBER PRODUCTS MANUFACTURED THEREFROM

(75) Inventors: Yoshimi Tsujiyama, Shiga (JP); Hisanobu Minamizawa, Shiga (JP); Junji Iwata, Shiga (JP)

(73) Assignees: Chisso Corporation, Osaka (JP); Chisso Polypro Fiber Company Limited, Tokyo (JP)

( * ) Notice: Subject to any disclaimer, the term of this patent is extended or adjusted under 35 U.S.C. 154(b) by 0 days.

(21) Appl. No.: 12/129,436

(22) Filed: May 29, 2008

(65) Prior Publication Data

US 2008/0233819 A1 Sep. 25, 2008

Related U.S. Application Data

(62) Division of application No. 10/635,424, filed on Aug. 5, 2003, now Pat. No. 7,405,171.

(30) Foreign Application Priority Data

Aug. 8, 2002 (JP) ............... 2002-231366
Jul. 8, 2003 (JP) ............... 2003-193414

(51) Int. Cl.
*D04H 1/00* (2006.01)
*D04H 13/00* (2006.01)
*D04H 5/00* (2006.01)

(52) U.S. Cl. .............. 442/328; 442/341; 442/401; 442/415

(58) Field of Classification Search ............... 442/328, 442/341, 401, 415
See application file for complete search history.

(56) References Cited

U.S. PATENT DOCUMENTS

| | | | | |
|---|---|---|---|---|
| 4,107,364 A | * | 8/1978 | Sisson | 428/196 |
| 5,225,018 A | * | 7/1993 | Zeldin et al. | 156/167 |
| 5,260,126 A | * | 11/1993 | Collier et al. | 442/329 |

FOREIGN PATENT DOCUMENTS

| | | |
|---|---|---|
| JP | 07-081230 | 3/1995 |
| JP | 2002-242069 | 8/2002 |

* cited by examiner

*Primary Examiner*—Norca L Torres-Velazquez
(74) *Attorney, Agent, or Firm*—J.C. Patents

(57) ABSTRACT

Problem to be Solved: To provide an elastic nonwoven fabric with a good elasticity, adequate strength under elongation, good antiblocking property and favorable feeling, suitable for fiber products, at low cost, as well as fiber products using the same. Solution: An elastic nonwoven fabric comprising long elastomeric fiber and nonelastomeric fiber in a weight ratio within a range from 50/50 to 95/5, which has an elongation recovery rate of the elastic nonwoven fabric after 50% elongation equal to or higher than 70%, and a resistance to peel two sheets of the nonwoven fabric apart equal to or lower than the strength of the fabric under 50% elongation; as well as fiber products using the same.

11 Claims, 1 Drawing Sheet

ELASTIC NONWOVEN FABRIC AND FIBER PRODUCTS MANUFACTURED THEREFROM

CROSS-REFERENCE TO RELATED APPLICATION

This application claims the priority benefit of Japan application serial no.JP 2002-231366, filed Aug. 8, 2002 and JP2003-193414, filed Jul. 8, 2003. This application also claims the priority of U.S. application Ser. No. 10/635,424, filed Aug. 5, 2003. All disclosure of the above applications are incorporated herein by reference.

BACKGROUND OF THE INVENTION

1. Field of the Invention

The present invention relates to elastic nonwoven fabric and fiber products manufactured therefrom. More specifically, it relates to elastic nonwoven fabric having a good elasticity, adequate strength under elongation, good antiblocking property, and favorable feeling, which is relatively inexpensive and suitable for fiber products.

2. Description of the Related Art

Elastic nonwoven fabrics have often been used recently to improve body fitting of clothes to the body. Such fabrics are particularly suitable for disposable diapers, clothes, caps, bandages and tapes due to their comfortable fit, elasticity and stretching property. While thermoplastic elastomers are often used to obtain nonwoven fabrics with such properties as mentioned above, most thermoplastic elastomers tend to show higher adhesiveness with higher elasticity. This renders elastic nonwoven fabrics made from highly elastic thermoplastic elastomers unsuitable, or at most usable only with uncomfortable feeling, for products directly applied to the skin under clothes.

Another problem of such nonwoven fabrics is the adhesiveness, by which the component fibers stick to each other during production or storage, particularly under high temperatures and the weight of a pile in storage in summer, which results in a higher tension needed for unwinding a roll of such a nonwoven fabric, thus often leading to excessive stretch or breakdown of the product. Low adhesiveness, or antiblocking nonwoven fabric is needed to solve this problem.

A method for obtaining good antiblocking property is to spin the fiber for nonwoven fabrics from a mixture of a thermoplastic elastomer with a low adhesiveness polyolefin, as disclosed in Reference 1. However, the nonwoven fabric obtained in this manner shows an insufficient antiblocking property due to scarcity of the polyolefin on the fiber surface, and a low elasticity due to the polyolefin that has only a low elasticity, and is thus unsuitable for uses mentioned above.

Another invention provides a nonwoven fabric consisting of an elastomeric fiber made from a thermoplastic elastomer blended with a nonelastomeric fiber made from a nonelastomeric thermoplastic, as disclosed in Reference 2. This product is, however, a simple mixture of the two fibers without any attempt to obtain high elasticity and antiblocking property simultaneously. In fact, a composition of elastomeric fiber/nonelastomeric fiber=30/70 on the weight basis described in the examples 1 and 2 of the invention, present in an excessive proportion of the nonelastomeric fibers, without any treatment to endow the fabric a high elasticity, cannot provide the excellent performance desired.

Patent Reference 1
  Japanese Patent Application Laid-Open No. 7-81230

Patent Reference 2
  Japanese Patent Application Laid-Open No. 2002-242069

Problems to be Solved by the Invention

The object of the present invention is to provide a nonwoven fabric with a good elasticity, adequate strength under elongation, good antiblocking property and favorable feeling, suitable for fiber products, at low cost, as well as fiber products using the same.

The present inventors have found that the requirements above are met by an elastic nonwoven fabric containing a long elastomeric fiber and a nonelastomeric fiber at a ratio ranging from 50/50 to 95/5 on a weight basis, wherein an elongation recovery rate of the nonwoven fabric after 50% elongation is 70% or higher, and a separation resistance of two sheets of the same is equal to or less than the strength at 50% elongation.

SUMMARY OF THE INVENTION

The invention therefore consists in:
(1) an elastic nonwoven fabric containing a long elastomeric fiber and a nonelastomeric fiber at a ratio ranging from 50/50 to 95/5 on a weight basis, wherein the elongation recovery rate of the nonwoven fabric after 50% elongation is 70% or higher, and the separation resistance of two sheets of the same is equal to or less than the strength at 50% elongation,
(2) an elastic nonwoven fabric described in (1) above, wherein the said long elastomeric fiber is manufactured by the melt-blowing method,
(3) an elastic nonwoven fabric described in (1) or (2) above, wherein the said long elastomeric fiber comprises at least one of the group consists of elastomeric polystyrenes and elastomeric polyolefins,
(4) an elastic nonwoven fabric described in any of (1)-(3) above, wherein the said nonelastomeric fiber has an average diameter (Ad) of 1 to 20 μm, whereas the said long elastomeric fiber has an average diameter (Bd) of 5 to 40 μm, and the said two average diameters are related to each other by $Ad \leqq Bd$,
(5) a laminated elastic nonwoven fabric manufactured by laminating at least one item chosen from the group consisting of a nonwoven fabric different from one described in (1) above, film, web, textile, knit and fiber bundle, to an elastic nonwoven fabric described in any of (1)-(4) above, and
(6) a fiber product which employs the elastic nonwoven fabric described in any of (1)-(4) or the laminated elastic nonwoven fabric described in (5) above.

DETAILED DESCRIPTION OF THE PREFERRED EMBODIMENT

The present invention will be described in more detail below.

The elastic nonwoven fabric according to the invention contains a long elastomeric fiber and a nonelastomeric fiber at a ratio ranging from 50/50 to 95/5 on a weight basis, wherein the elongation recovery rate of the nonwoven fabric after 50% elongation is 70% or higher, and the separation resistance of two sheets of the same is equal to or less than the strength at 50% elongation.

The long elastomeric fiber used in the invention is obtained from a resin composition containing an elastomeric resin as the principal component (the component of the highest content).

An elastomeric resin means a polymer material which shows elasticity similar to that of vulcanized rubber (due to soft segments in the molecule) at room temperature (20 to 30°

C.), and can be formed into fibers in a conventional machine (due to hard segments in the molecule) at high temperatures. More specifically, it refers to a resin from which a film is obtained that can be stretched by more than 25% at room temperature (20 to 30° C.) and shows an elastic recovery rate of elongation of 85% or higher at a 25% elongation.

Examples of such elastomeric fibers include polystyrene elastomers, polyolefin elastomers, polyester elastomers, polyamide elastomers, and polyurethane elastomers. Polystyrene elastomers and polyolefin elastomers are particularly favorable in terms of moldability, chemical resistance, possibility of regeneration, and environment friendliness (low toxic emission on combustion).

Polystyrene elastomers can be manufactured by copolymerizing an aromatic vinyl compound with other comonomers, such as diene compounds including butadiene, isoprene, and chloroprene; olefins including ethylene, propylene, butene and hexene; (meth)acrylic acid and its esters with methanol, ethanol, butanol, hexanol or other alcohols; and other monomers susceptible to copolymerization with aromatic vinyl compounds.

Particularly preferable polystyrene elastomers are styrene block copolymers containing at least one polymer block (a) chiefly comprising aromatic vinyl compounds and at least one polymer block (b) chiefly comprising conjugate diene compounds, more than 80% of the double bonds derived from the conjugate dienes being saturated by hydrogen; and random copolymers of aromatic vinyl compounds with conjugate diene compounds. Incidentally, "chiefly comprising" implies here that the compounds in question account for 50 wt. % or more of a polymer block.

Examples of the aromatic vinyl compounds used in the said styrene block copolymers include styrene, α-methylstyrene, vinyltoluene and p-tert-butylstyrene; styrene is particularly preferable. Any of such compounds may be used singly or in combination with others. Examples of the conjugate diene compounds used in the said styrene block copolymers include 1,3-butadiene, isoprene, 1,3-pentadiene, 2,3-dimethyl-1,3-butadiene; butadiene and isoprene are particularly preferable. Any of such compounds may be used singly or in combination with others. Eighty percent or more of double bonds in the said styrene block copolymers, derived from the double bonds in the diene comounds, should preferably be saturated by hydrogen in order to obtain a copolymer with high stability and good spinning property.

Specific examples of such styrene block copolymers include styrene-ethylenebutylene-styrene block copolymers (SEBSs), styrene-ethylenepropylene-styrene block copolymers (SEPSs) and styrene-ethylenbutylene-olefin crystalline block copolymers (SEBCs). Commercial products such as Kraton G (Kraton Polymer Japan), Septon (Kuraray), Tuftec (Asahi Chemical) and JSR Dynaron (JSR) belong to this class of copolymers.

A preferable example of the said random copolymers of polyethylene elastomers is a hydrogenated styrene-diene copolymer wherein more than 80% of the double bonds derived from the conjugate diene component are saturated by hydrogen.

Examples of the conjugate diene compounds used as the diene component of the said hydrogenated styrene-diene copolymer include 1,3-butadiene, isoprene, 1,3-pentadiene, 2,2-dimethylbutadiene, and 3-ethylbutadiene, among which 1,3-butadiene, isoprene and 1,3-pentadiene are preferable, and 1,3-butadiene is particularly preferable. Examples of the aromatic vinyl compounds used as a component of the said hydrogenated styrene-diene copolymer include styrene, α-methylstyrene, p-methylstyrene, p-ethylstyrene and vinylnaphthalene, among which styrene, p-methylstyrene and p-ethylstyrene are preferable, and styrene is particularly preferable.

The said hydrogenated styrene-diene copolymer should preferably be a copolymer of at least one conjugate diene compound with aromatic vinyl compounds which account for 3-50 weight % of the polymer, having a molecular weight distribution (Mw/Mn=weight average molecular weight/number average molecular weight) of 10 or lower, the diene component containing 10-90 weight % of vinyl bonds and at least 80% of olefinic unsaturated bonds in the whole molecule being hydrogenated.

An example of commercial products belonging to this category is JSR's JSR Dynaron.

Examples of the said polyolefin elastomers include random copolymers consisting of olefin monomers randomly bonded to each other, and block copolymers consisting of hard and soft segments.

Specific examples of the said block copolymers of polyolefin elastomers include those chiefly comprising hydrogenated diene copolymers. Preferable hydrogenated diene compounds consist of polymer blocks (c) chiefly comprising conjugate diene compounds rich in 1,4-bonds, and polymer blocks (d) chiefly comprising conjugate diene compounds rich in 1,2- and 3,4-bonds, with the double bonds derived from the diene copolymers being saturated. Incidentally, "conjugate diene compounds rich in 1,4-bonds" above implies that the content of 1,4-bonds in the compound is higher than that of 1,2- or 3,4-bonds, whereas "rich in 1,2- and 3,4-bonds" means that the content of 1,2- and 3,4-bonds is higher than that of 1,4-bonds, and "chiefly comprising conjugate diene compounds" implies that the conjugate dienes represent the richest component of the polymer block.

The content of 1,4-bonds in the said polymer blocks (c) composing the said hydrogenated diene copolymer is preferably 70 weight % or higher, or more preferably 80 weight % or higher, while the content of the said polymer blocks (c) in the said hydrogenated diene copolymer is preferably 1-99 weight %, or more preferably 5-65 weight %, and most preferably 5-50 weight %. Furthermore, the content of 1,2- and 3,4-bonds in the said polymer blocks (d) composing the said hydrogenated diene copolymer is preferably 25 weight % or higher, or more preferably 30 weight % or higher, while the content of the said polymer blocks (d) in the said hydrogenated diene copolymer is preferably 1-99 weight %, or more preferably 35-95 weight %, and most preferably 50-95 weight %.

The conjugated diene compounds in the said hydrogenated diene copolymers may be, for example, 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene, among which 1,3-butadiene, isoprene and 1,3-pentadiene are preferable because of commercial availability and because of the possibility of giving hydrogenated diene copolymers with excellent physical properties. A preferable example of the hydrogenated diene copolymers has a numerical average molecular weight of 40,000-700,000 wherein 70% or more of the double bonds derived from conjugate diene components are saturated, manufactured by hydrogenating at least one of the block copolymers selected from: a (c)-(d) block copolymer, a (c)-(d)-(c) block copolymer, and a block copolymer formed by extension or branching of such block copolymers over coupler residues, said polymer block (c) consisting of polybutadiene containing 25 weight % or less 1,2-bonds and the said polymer block (d) chiefly comprising conjugate diene compounds containing 50 weight % or more of 1,2- and 3,4-bonds derived from the conjugate diene components. Particularly preferable is a highly elastic fiber known as CEBC manufactured from a crystalline olefin-ethylenebutylene-crystalline olefin block copolymer. JSR's JSR Dynaron is a commercially available example of CEBC. A phenoxyimine complex catalyst may be used for manufacture of CEBCs.

The present invention utilizes conveniently linear or branched hydrogenated diene block copolymers wherein the said polymer blocks (d) are copolymers of aromatic vinyl compounds and conjugate diene compounds containing 70 weight % or more of the latter, the said conjugate diene compounds containing 25-70 weight % of vinyl bonds and the block structure being represented as (c)-(d-c)n or (c-d)m, where n is an integer equal to or greater than 1 and m is an integer equal to or greater than 2. The said aromatic vinyl compounds may be styrene, α-methylstyrene, p-methylstyrene, t-butylstyrene, divinylbenzene, N,N-dimethyl-p-aminoethylstyrene, N,N-diethyl-p-aminoethylstyrene or vinylpyridine, styrene and α-methylstyrene being more preferable.

The random copolymers of polyolefin elastomers mentioned earlier are copolymers of hydrocarbons with double bonds represented by $CnH2n$ (n is an integer equal to or greater than 2), such as ethylene, propylene or butene, with at least one monomer different from the same, particularly those in which the monomer units are arranged randomly.

Random copolymers with a density of 0.850-0.920 $g/cm^3$ are preferable for the purpose of the invention. Density affects the elasticity of the fiber; a density far higher than 0.920 $g/cm^3$ may result in an extremely low elasticity of the nonwoven fabric obtained.

The said random copolymers should preferably be copolymers of ethylene with α-olefins containing 3-10 carbon atoms, or of propylene with α-olefins containing 4-10 carbon atoms, in order to obtain fibers with favorable feeling and elasticity. More preferable are copolymers of ethylene with α-olefins containing 3-10 carbon atoms, such as propylene, 1-butene, 3-methyl-1-butene, 4-methyl-1-butene, 1-pentene, 1-hexene, 4-methyl-1-pentene, 1-heptene, 1-octene, 1-nonene, or 1-decene. Particularly preferable α-olefins include 1-butene, 1-pentene, 1-hexene and 1-octene. Any of these α-olefins may be used singly or in combination with each other, preferable combinations including ethylene-octene and ethylene-butene copolymers. The copolymer of ethylene with α-olefins containing 3-10 carbon atoms, or of propylene with α-olefins containing 4-10 carbon atoms, used in the invention should preferably have a molecular weight distribution (Mw/Mn) of 1.5-4 to achieve a favorable spinning property. Such copolymers commercially available include Engage (DuPont Dow Elastomer Japan) and Tafmer (Mitsui Chemical). Metallocene catalysts may be used in the manufacture of the polyolefin copolymers used in the invention. Furthermore, a diene-based monomer may be added to the said α-olefins for crosslinking, yielding three-component copolymers such as ethylene-propylene-diene rubber or ethylene-butene-diene rubber.

In addition, the said polyolefin elastomers may also be elastomeric polypropylene or propylene-ethylene block copolymers.

Elastomeric polypropylene is a stereo-block copolymer of isotactic or syndiotactic polypropylene (hard segment) and atactic polypropylene (soft segment). The elastomeric polypropylenes as described in the specifications U.S. Pat. No. 4,335,225, U.S. Pat. No. 4,522,982 and U.S. Pat. No. 5,188,768, which cover both homopolymers and copolymers, may thus be used in the present invention. The copolymers may contain olefinic units other than propylene, such as ethylene, butylene, pentene or hexene, in the molecule. Such copolymers contain substantially stereoregular block structure, such as selectively arranged isotactic and atactic polypropylene blocks, in the backbone.

On the other hand, the said propylene-ethylene block copolymer is a true block copolymer, as disclosed in WO 00/23489, in which polypropylene and poly(ethylene-co-propylene) segments are not simply blended but chemically bonded. As a specific example, a propylene-ethylene block copolymer, in which polypropylene segments are covalently bonded to poly(ethylene-co-propylene) segments, can be manufactured by first synthesizing a specified quantity of polypropylene segment in a particular polymerization zone (i) in a short time period, followed by synthesizing a specified quantity of poly(ethylene-co-propylene) segment at another polymerization zone (ii), in a polymerization reactor, preferably a tube-type reactor as described in JP09-87343, preferably by a liquid-phase process, in the presence of a titanium-halogen or titanium-magnesium-halogen solid catalyst and an organometallic olefin polymerization catalyst, such as triethylaluminum, as well as an optional electron donor compound added. The propylene-ethylene block copolymer thus obtained has a weight average molecular weight (Mw) higher than 100,000, and contains 5-100 weight % of the poly(ethylene-co-propylene) segment as well as 2-95% of the total ethylene.

The said polyester elastomer may be a polyether ester block copolymer consisting of a thermoplastic polyester as the hard segment and a polyalkylene glycol as the soft segment. More specifically, it may be a three-component copolymer obtained from at least one dicarboxylic acid selected from: aromatic dicarboxylic acids such as terephthalic acid, isophthalic acid, phthalic acid, naphthalene-2,6-dicarboxylic acid, naphthalene-2,7-dicarboxylic acid, diphenyl-4,4-dicarboxylic acid, diphenoxyethanedicarboxylic acid or 3-sulfoisophthalic acid, alicyclic dicarboxylic acids such as 1,4-cyclohexanedicarboxylic acid, aliphatic dicarboxylic acids such as succinic acid, oxalic acid, adipic acid, sebacic acid, dodecanedicarboxylic acid or dimeric acid, and ester-forming derivatives thereof; at least one diol selected from: aliphatic diols such as 1,4-butanediol, ethylene glycol, trimethylene glycol, tetramethylene glycol, pentamethylene glycol, hexamethylene glycol, neopentyl glycol or decamethylene glycol, alicyclic diols such as 1,1-cyclohexanedimethanol, 1,4-cyclohexanedimethanol or tricyclodecanedimethanol, and ester-forming derivatives thereof; and at least one poly(alkylene oxide) glycol selected from: polyethylene glycol or poly(1,2- and 1,3-propylene oxide) glycol with an average molecular weight of about 400-5000, ethylene oxide-propylene oxide copolymer, and ethylene oxide-tetrahydrofuran copolymer.

The said polyamide elastomer may be a copolymer of nylon as a hard segment with a polyester or polyol as a soft segment, such as nylon 12-polytetramethylene glycol block copolymer.

A typical example of the said polyurethane elastomer may be obtained by chain extension by a polyamine, chiefly comprising diamines, of a prepolymer having an isocyanate group at either end formed by reacting a polyether and/or polyester with a hydroxy group at either end and a numerical average molecular weight of 1000-6000 with a polyisocyanate chiefly comprising organic diisocyanates.

In the present invention, various stabilizers, UV absorbers, viscocity improvers, deglossing agents, colorants, rubber or other flexibility improvers, or other improvers, may be added to the said elastomeric resins as necessary, as far as the addition does not affect the advantage of the invention.

The elastomeric long fiber in the present invention is obtained by spinning out of the elastomeric resins described above, preferably with a length over 300 mm.

Such long fiber may be manufactured by spraying the thermoplastic resin with compressed air at high temperatures to open and settle as nonwoven fabric (e.g. the melt blowing method), spinning the resin followed by stretching, opening, collecting and intertwining to obtain nonwoven fabric (e.g. spun-bonding method), or stretching of long thermoplastic resin fiber bundles followed by crimping, opening and expansion (e.g. tow opening method).

Among these methods, the melt blowing and spun-bonding processes are preferable because of high productivity, low production costs, ease of production and the feeling of products. Melt-blown nonwoven fabric presents comfortable feeling because of low average diameter of the component fibers, while spunbonded nonwovens have high strength because the component fibers are stretched continuous long fibers. These nonwoven fabrics may be surface treated as necessary, e.g. with surfactants.

The nonelastomeric fiber in the invention is obtained from resin compositions chiefly comprising nonelastomeric resins. Although its function is only to provide the elastic nonwoven fabric with antiblocking property and favorable feeling, it is preferable for a film obtained from the said resin, with 25% elongation, to have an elastic recovery rate of elongation less than 85%, or more favorably less than 80%.

Such a nonelastomeric resin may be polyesters, polyamides or polyolefins. Polyolefins are preferable because of low costs and ease of processing in addition to favorable feeling and slip given to the nonwoven fabric obtained. Polypropylene and polyethylene are particularly preferred from this respect.

In the present invention, various stabilizers, UV absorbers, viscosity improvers, deglossing agents, colorants, rubber or other flexibility improvers, or other improvers, may be added to the nonelastomeric resins as necessary, as far as the addition does not affect the advantage of the invention.

The nonelastomeric fiber in the invention is manufactured by spinning the said resin composition chiefly comprising nonelastomeric resins into fiber.

No particular restriction is imposed on the method to manufacture such nonelastomeric fibers; examples include production of short fibers such as staple fibers or chopped fibers, and production of long fibers such as melt blowing, spun-bonding and tow opening. Melt blowing and spun-bonding are preferred for the feeling and strength, respectively, of the product.

The elastic nonwoven fabric according to the invention contains a long elastomeric fiber and a nonelastomeric fiber at a ratio ranging from 50/50 to 95/5 on a weight basis; the ratio ranges preferably from 50/50 to 90/10, or more desirably 60/40 to 90/10. A relative weight of the long elastomeric fiber under said range leads to a fabric with insufficient elasticity, while one over said range to a sticky fabric with poor antiblocking property.

According to the invention, the nonelastomeric fiber is mixed with the elastomeric fiber to provide the elastic nonwoven fabric with an antiblocking property and favorable feeling. The mixing may be performed in any of the known methods. For example, a melt blowing process of elastomeric long fiber production may have a step in which short, long or chopped nonelastomeric fiber is fed while long elastomeric fiber is sprayed onto a collecting conveyor net. An alternative may be spraying melt-blown long elastomeric fiber while forming a web of short or long fiber.

When using melt-blown long fiber as the nonelastomeric fiber composing the elastic nonwoven fabric of the invention, a spinneret as described in U.S. Pat. No. 3,981,650 may be used which has spinning holes for different resins alternately arranged in a row. The elastomeric and nonelastomeric long fibers are more uniformly mixed in the web produced in this manner. Alternatively, separate spinnerets may be used for elastomeric and nonelastomeric resin, respectively, to obtain long elastomeric fiber and long nonelastomeric fiber webs which are subsequently laminated and, as necessary, further processed to improve fiber mixing by e.g. needle punching. A more uniformly mixed web may be obtained using the spinneret disclosed in U.S. Pat. No. 3,981,650.

The content of the elastomeric and nonelastomeric fibers in the elastic nonwoven fabric may be modified by changing the number of holes allocated to the elastomeric and nonelastomeric resins, or by controlling the extrusion rate of each resin. A mixture of fibers with different fineness may be manufactured by spinning each resin at different extrusion rates through the spinning holes allocated, or by spinning through spinnerets with different opening diameters.

When using spunbonded long fiber as the nonelastomeric fiber composing the elastic nonwoven fabric of the invention, a spinneret as shown in FIG. 1 may be used, which has spinning holes for different resins arranged in a staggered manner. The elastomeric and nonelastomeric long fibers are more uniformly mixed in the web produced in this manner. Alternatively, separate spinnerets may be used for elastomeric and nonelastomeric resin, respectively, to obtain long elastomeric fiber and long nonelastomeric fiber webs which are subsequently laminated and, as necessary, further processed to improve fiber mixing by e.g. needle punching.

The content of the elastomeric and nonelastomeric fibers in the elastic nonwoven fabric may be modified by changing the number of holes allocated to the elastomeric and nonelastomeric resins, or by controlling the extrusion rate of each resin. A mixture of fibers with different fineness may be manufactured by spinning each resin at different extrusion rates through the spinning holes allocated, or by spinning through spinnerets with different opening diameters.

The elastic nonwoven fabric according to the invention has at least two components: an elastomeric resin and a nonelastomeric resin. It may be a three- or four-component composition containing different elastomeric and/or nonelastomeric long fiber, but the two-component system is preferred with respect to production costs or productivity.

The cross section of the long or short fiber composing the nonwoven fabric of the invention may be circular, other forms, or even hollow, as far as the spinning properties remain unaffected. The average diameter of the long or short fiber is not restricted in particular. A low average diameter (Bd) of the long elastomeric fiber gives the product favorable feeling but results in barely satisfactory elasticity and strength. On the other hand, a high Bd leads to satisfactory elasticity and strength accompanied by poor feeling. Practically, therefore, the average diameter (Bd) of the long elastomeric fiber should preferably range from 5 to 40 μm, or, to obtain favorable feeling, from 5 to 30 μm.

The principal role of the nonelastomeric fiber in the invention is to improve the antiblocking property. A lower average diameter (Ad) of the nonelastomeric fiber means a higher relative surface area of it in the nonwoven fabric, which results in more effective antiblocking due to increased coverage of the long elastomeric fiber. Although a low content of the nonelastomeric fiber in the nonwoven fabric will generally result in a poor antiblocking property, this can be compensated for by reducing the average diameter (Ad) of the nonelastomeric fiber. The preferred average diameter (Ad) of the nonelastomeric fiber is, therefore, 1-20 μm, taking productivity into account, or rather 1-10 μm, considering also feeling of the product. In addition, it is desirable that the diameters of the two fibers be in a relation Ad≦Bd and Bd/Ad≧2, or more desirably Bd/Ad≧5.

The relation Ad≦Bd assures satisfactory elasticity, strength and antiblocking property of the nonwoven fabric produced. Even in a hot and humid season that tends to cause blocking of long elastomeric fiber, the relation controls blocking because the contact area between the long fibers is maintained at a relatively low level. Laminating at least one side of the elastic nonwoven fabric with a thin web of fine nonelastomeric fiber, as far as it does not impair the elasticity of the former, is an effective way to prevent blocking.

The elastic nonwoven fabric of the invention should show an elongation recovery rate after 50% elongation is 70% or higher, preferably 80% or higher, or more desirably 90% or higher. A fabric with an elongation recovery rate after 50% elongation of far lower than 70% results in products with poor elasticity. For example, a disposable shorts-type diaper involving such a fabric may not fit well because it does not recover completely from the stretch when wearing.

A feature of the invention is mixing the elastic and adhesive long elastomeric fiber with the low-sticking nonelastomeric fiber. Increasing the weight ratio of the long elastomeric fiber (elastomeric/nonelastomeric) leads to increase in elasticity (elongation recovery rate after 50% elongation); conversely, increasing the weight ratio of the nonelastomeric fiber results in good antiblocking property.

Good antiblocking property is reflected in a low resistance in peeling apart two sheets of elastic nonwoven fabric (referred to as "peeling strength" hereinafter). The elastic nonwoven fabric is usually wound up onto a roller for storage, and unwound as necessary for further processing. A low peeling strength of the fabric means that the fabric can be unwound by a tension low enough not to cause plastic deformation of the fabric, thus assuring ease of operation and high product quality.

Conversely, a fabric with a high peeling strength requires a high tension for separating the fabric layers in contact when unwinding, leading to breakage, or excessive elongation that prevents further processing of the fabric.

The elastic nonwoven fabric according to the invention should have a peeling strength less than the strength at 50% elongation to maintain the ease of handling and product quality. Specifically, this specification overcomes the problem for elastic nonwoven fabric rolls prepared in summer which otherwise tend to present difficulty in unwinding because of adhesion between fiber yarns due to high temperatures and loads.

Although the elastic nonwoven fabric according to the invention may have any basic weight, a common range of basic weight is 5-300 g/m²; a preferable range of basic weight is 10-200 g/m²; a range of 20-150 g/m² is particularly desirable. The nonwoven fabric may be heat-treated, as necessary, between the softening point of the elastomeric resin used in the fabric and that of the nonelastomeric resin, in any of the known methods including thermocompression under heated embossing rollers, air through bonding by hot air, and IR lamp irradiation. Moreover, other processing, such as sonic bonding, water jetting, needle punching, and/or resin bonding, may be performed on the fabric.

It is also possible to stretch the nonwoven fabric itself manufactured according to the invention. On stretching the fabric, the nonelastomeric fiber is elongated while the long elastic fiber restores its original length elastically, thus avoiding any interference of the nonelastomeric fiber to the elasticity of the fabric. This is a particularly desirable embodiment of the invention because it gives a bulky nonwoven fabric with favorable feeling.

A specific example of such a processing is stretching the nonwoven fabric at 20-30° C. in the machine direction (MD) or cross-machine direction (CD) to 1.2 times or higher (insofar as not to cause breakage), preferably to 1.5-3.5 times, or more desirably 2.0-3.2 times the original length, followed by relaxation and winding into a roll. The product has particularly good elasticity in the stretched direction.

The direction of stretching in the said stretching processing is not restricted, but determines the direction of preferred elasticity.

The present invention covers also laminated elastic nonwoven fabrics obtained by laminating to the fabric at least one of the group comprising nonwoven fabric other than the product itself, film, web, textile, knit and fiber bundle. The laminating material should preferably provide the fabricated laminate with an elongation of 20% or higher in order not to deter elongation of the elastic nonwoven fabric. Examples include nonwoven fabric, net and film manufactured by melt-blowing from thermoplastic elastomers such as polystyrene elastomers, polyolefin elastomers, polyester elastomers or polyurethane elastomers. Knit or textile made of fibers derived from thermoplastic elastomeric resins, such as polystyrene elastomers, polyolefin elastomers, polyester elastomers or polyurethane elastomers; web, nonwoven fabric, textile or knit made of nonelastomeric materials rendered elastic structurally by crimping may also be used. Furthermore, curded or air-laid web may be laminated by water jet, point bonding or through air bonding. These examples, however, do not limit the scope of the invention.

The elastic nonwoven fabric according to the invention may be used in the elastic members of sanitary products such as diapers, disposable diapers, sanitary napkins and diaper covers, elastic tapes, adhesive plasters, and elastic members of clothes. It may also be used in interfacing for clothes, electric and heat insulators for clothes, protective wear, hats, masks, gloves, supporters, stretch bandages, poultice substrates, plaster substrates, non-slip substrates, vibration absorbers, fingerstalls, filters (air filters for clean rooms, blood filters, oily water separation filters, electret filters), separators, heat insulators, coffee bags, food packaging, vehicle members (ceiling facings, soundproof materials, substrates, cushions, loudspeaker screens, air cleaners, insulator facings, backings, bonded nonwoven fabrics for seats, door trimmings), cleaning materials including those for copying machines, carpet facings, agricultural sheets, wood draining materials, shoe members e.g. sports shoes facings, bag members, industrial sealing materials, wiping materials and bed sheets. These examples do not limit the scope of the invention.

EXAMPLES

The invention is further described below using examples and comparative examples. They do not limit the scope of the invention. Measurement results quoted in the examples were obtained by the methods described below.

(i) Elongation Recovery Rate after 50% Elongation

A test piece, 25 mm wide and 200 mm long (in the machine direction), of the nonwoven fabric was mounted to a testing machine (Shimadzu Autograph AG-G) at a chuck distance of 100 mm. The test piece was stretched up to 50% at a rate of 300 mm/min, and the machine was reversed at the same rate until the load on the test piece vanished. The piece was again stretched immediately up to 50% at the same rate, and the length L (mm) was measured when the load appeared. The elongation recovery rate after 50% elongation was calculated by the formula:

Elongation recovery rate after 50% elongation (%)= {(100(*1)−L)/100(*1)}×100 (* 1): Initial length of the test piece (mm)

(ii) Strength at 50% Elongation

A test piece, 25 mm wide and 200 mm long (in the machine direction), of the nonwoven fabric was mounted to a testing machine (Shimadzu Autograph AG-G) at a chuck distance of 100 mm. The test piece was stretched at a rate of 300 mm/min, and the load at 50% elongation (N/25 mm) was measured.

(iii) Feeling

A sheet of the nonwoven fabric 100×100 mm in size was given to a panel consisting of 10 members for evaluation of the feeling by touch. Each panelist answered with a point on a 10-point scale. The evaluation was based on the total of the panelists' answers, i.e. on a 100-point scale. The feeling of the specimen was evaluated as good when it acquired 60 points or more, or preferably 70 points or more.

(iv) Peeling Strength

Two sheets of the nonwoven fabric 100×100 mm in size were superimposed, upon which an aluminum plate 100×100 mm in size was laid with weights such that the total load on the fabric was 5 kg. The assembly was placed in an oven and maintained at 50° C. for 24 hours. The test piece was then cut to a width of 25 mm in a room environment of 25° C. and 65% RH. One end of the piece 50 mm in length was peeled apart by hand, and each of the separated ends was fixed onto the chucks of the testing machine (Shimadzu Autograph AG-G) at a distance of 50 mm. The specimen was stretched at a rate of 100 mm/min until the two sheets were completely separated. An average of five measurements was taken as the peeling strength (N/25 mm) result. A low peeling strength indicates a favorable antiblocking property.

(v) Average Fiber Diameter

Five sheets 10×10 mm in size were cut out of the elastic nonwoven fabric at arbitrary locations for observation by a scanning electron microscope (JEOLCO). Diameters were measured for twenty fibers in each sheet, and the total of 100 measurements was averaged to obtain the fiber diameter (D). The sheets were then treated with an appropriate solvent selected from the list below in a Soxhlet extractor to remove the elastomeric fiber, and subsequently underwent similar measurements to determine the average fiber diameter of the nonelastomeric fiber (Ad). Meanwhile, the weight ratio of the long elastomeric fiber/nonelastomeric fiber was separately measured, and the densities of the component resins were determined after JIS L 1015 (density gradient tube method). These data were used to convert the weight ratio of the component fibers to the volumetric ratio for calculation of the average fiber diameter of the long elastomeric fiber (Bd) as follows.

If the density of the long elastomeric fiber is $B\rho$, that of the nonelastomeric fiber is $A\rho$, and their weight ratio is $Bw/Aw$, the volumetric fraction of the long elastomeric fiber is $$Bv=(Bw/B\rho)/\{(Bw/B\rho)+(Aw/A\rho)\}$$

and that of the nonelastomeric fiber is $$Av=(Aw/A\rho)/\{(Bw/B\rho)+(Aw/A\rho)\}.$$

Therefore the diameter of the long elastomeric fiber is $$Bd=(D-Ad\times Av)/Bv$$

(Extraction Solvents)
For polyurethane elastomers: Conc. hydrochloric acid
For polystyrene elastomers: Toluene
For polyolefin elastomers: Toluene
For polyamide elastomers: Aniline
For polyester elastomers: Conc. sulfuric acid Materials used in the invention are listed below with corresponding symbols.

Elastomeric Resins
B-1: Syrene-ethylenebutylene-styrene block copolymer, Kraton G 1657 (Kraton Polymer Japan)
B-2: Syrene-ethylenebutylene-styrene block copolymer, Dynaron 8600P (JSR)
B-3: Crystalline olefin-ethylenebutylene-crystalline olefin block copolymer, Dynaron 6200P (JSR)
B-4: Hydrogenated styrene-diene copolymer, Dynaron 2324P (JSR)
B-5: Ethylene-octene copolymer, Engage 8401 (DuPont Dow Elastomer Japan)
B-6: B-1 blended with B-5 at a ratio 1:1 on weight basis.
B-7: Thermoplastic urethane polymer, Pandex T-1180 (DIC Bayer Polymer)
B-8: Polyester elastomer, Grilux E-200LV (Dainippon Ink Chemical)
B-9: Polyamide elastomer, Pebax 2533 (Atofina Japan)
B-10: B-2 blended with B-5 at a ratio 95:5 on weight basis.

Nonelastomeric Resins
A-1: Polypropylene, Chisso Polypro CS3300 (Chisso)
A-2: Propylene-ethylene-butene copolymer (4 wt % ethylene, 2.65 wt % butene), Chisso Polypro CS 3650 (Chisso)
A-3: Polyethylene, Chisso Polyethy S6900 (Chisso)
A-4: Polyethylene terephthalate, K101 (Kanebo)

Example 1

A melt-blown nonwoven fabric was manufactured from the elastomeric resin B-1 and nonelastomeric resin A-1 in an apparatus comprising two extruders equipped with a screw 30 mm in diameter, heating elements and a gear pump, spinnerets for combined yarns (501 holes 0.3 mm in diameter, alternately for different yarns arranged in a row, 500 mm in effective width), an air compressor, an air heater, a collecting conveyor with a polyester net, and a take-up. The elastomeric and nonelastomeric resins were charged in the respective extruders, and melted by heating to 230° C. and 270° C., respectively. The gear pumps were set so that the weight ratio of the elastomeric/nonelastomeric resin was 95/5. The molten B-1 resin was discharged through the spinneret at a rate of 0.242 g per minute per hole, and the molten A-1 at 0.013 g per minute per hole. The threads formed were blown onto the conveyor, located at a distance of 25 cm from the spinneret and running at a rate of 2 m/min, by means of compressed air at 98 kPa (gauge) heated to 400° C. The air was removed by a suction unit behind the conveyor. The load on the conveyor was rolled up as elastic nonwoven fabric with a basic weight of 60 g/m². Properties of the fabric are summarized in Table 1. This nonwoven fabric showed a good elasticity and antiblocking property, an adequate strength at 50% elongation, and favorable feeling.

Example 2

An elastic nonwoven fabric was manufactured as in Example 1, except that the weight ratio of the elastic/nonelastic resin was 90/10 and the spinning rate was 0.230 g per minute per hole for B-1 and 0.026 g per minute per hole for A-1. Properties of the fabric obtained are summarized in Table 1. This nonwoven fabric showed a good elasticity and antiblocking property, an adequate strength under elongation, and favorable feeling.

Example 3

An elastic nonwoven fabric was manufactured as in Example 1, except that the weight ratio of the elastic/nonelastic resin was 80/20 and the spinning rate was 0.204 g per minute per hole for B-1 and 0.051 g per minute per hole for A-1. Properties of the melt-blown elastic nonwoven fabric obtained are summarized in Table 1. This nonwoven fabric showed a good elasticity and antiblocking property, an adequate strength under elongation, and favorable feeling.

A laminated elastic nonwoven fabric was manufactured by laminating a melt-blown nonwoven fabric made of the resin A-1, with a fiber diameter of 2 µm and a basic weight of 2 g/m$^2$, onto the fabric obtained in Example 3 using a hot embossed roller. The laminated fabric 2000 m in length was rolled and stored in a room at a temperature of 50° C. and humidity of 80%, simulating a warehouse environment in summer, for seven days. Subsequent measurement showed a peeling strength of 0.5 N/25 mm, indicating good antiblocking property.

The nonwoven fabric of Example 3 was substituted for the elastic net used in both sides of a commercial shorts-type disposable diaper (Procter & Gamble Far East, "Pampers Suku-Suku Pants L"). The modified diapers were provided for trial by five infants. No subject showed any mark of, or rash caused by, excessively tight fitting, or slippage or excrement escape due to poor fitting.

Another laminated nonwoven fabric was manufactured by placing a stretchy nonwoven fabric consisting of three-dimensionally crimpled polyolefin staple fiber, 100 g/m in basic weight, upon the fabric obtained in Example 3 and intertwining by water jet. Supporters were manufactured from this fabric and provided for trial by five monitors. After application around the knee for 24 hours, no subject showed any mark of, or rash caused by, excessively tight fitting, or slippage due to poor fitting.

Adhesive plaster was manufactured by coating one side of the fabric of Example 3 with an adhesive, and applying cloth coated with a hemostatic agent onto it. The plaster was provided for trial by ten monitors. After application around the index finger for 24 hours, no subject showed any mark of, or rash caused by, excessively tight fitting, or slippage due to poor fitting.

Surgical tape was manufactured by coating one side of the fabric of Example 3 with an adhesive, and was provided for trial by ten monitors. After application around the elbow for 24 hours, no subject showed any mark of, or rash caused by, excessively tight fitting, or slippage due to poor fitting.

A poultice was prepared by applying an analgesic onto the fabric of Example 3 and was provided for trial by ten monitors. After application around the knee for 24 hours, no subject showed any mark of, or rash caused by, excessively tight fitting, or slippage due to poor fitting.

Example 4

The elastic nonwoven fabric obtained in Example 3 was stretched 2.2 times in the machine direction at 23° C., relaxed and wound up into a roll. Properties of the stretched fabric are summarized in Table 1. This fabric showed a good elasticity and antiblocking property, an adequate strength under elongation, and favorable feeling.

The nonwoven fabric of Example 4 was substituted for the elastic net used in both sides of a commercial shorts-type disposable diaper (Procter & Gamble Far East, "Pampers Suku-Suku Pants L"). The modified diapers were provided for trial by five infants. No subject showed any mark of, or rash caused by, excessively tight fitting, or slippage or excrement escape due to poor fitting.

Adhesive plaster was manufactured by coating one side of the fabric of Example 4 with an adhesive, and applying cloth coated with a hemostatic agent onto it. The plaster was provided for trial by ten monitors. After application around the index finger for 24 hours, no subject showed any mark of, or rash caused by, excessively tight fitting, or slippage due to poor fitting.

Surgical tape was manufactured by coating one side of the fabric of Example 4 with an adhesive, and was provided for trial by ten monitors. After application around the elbow for 24 hours, no subject showed any mark of, or rash caused by, excessively tight fitting, or slippage by poor fitting.

Example 5

An elastic nonwoven fabric was manufactured as in Example 1, except that the weight ratio of the elastic/nonelastic resin was 70/30 and the spinning rate was 0.179 g per minute per hole for B-1 and 0.077 g per minute per hole for A-1. Properties of the fabric obtained are summarized in Table 1. This nonwoven fabric showed a good elasticity and antiblocking property, an adequate strength under elongation, and favorable feeling.

Example 6

An elastic nonwoven fabric was manufactured as in Example 1, except that the weight ratio of the elastic/nonelastic resin was 60/40 and the spinning rate was 0.153 g per minute per hole for B-1 and 0.102 g per minute per hole for A-1. Properties of the fabric obtained are summarized in Table 1. This nonwoven fabric showed a good elasticity and antiblocking property, an adequate strength under elongation, and favorable feeling.

Example 7

An elastic nonwoven fabric was manufactured as in Example 1, except that the weight ratio of the elastic/nonelastic resin was 50/50 and the spinning rate was 0.128 g per minute per hole for B-1 and 0.128 g per minute per hole for A-1. Properties of the fabric obtained are summarized in Table 1. This nonwoven fabric showed a good elasticity and antiblocking property, an adequate strength under elongation, and favorable feeling.

Example 8

An elastic nonwoven fabric was manufactured under processing conditions and using manufacturing apparatus similar to those in Example 1, except that the weight ratio of the elastic/nonelastic resin was 85/15 and the spinning rate was 0.217 g per minute per hole for B-1 and 0.038 g per minute per hole for A-1. Properties of the fabric obtained are summarized in Table 1. This nonwoven fabric showed a good elasticity and antiblocking property, an adequate strength under elongation, and favorable feeling.

Example 9

An elastic nonwoven fabric was manufactured as in Example 1, except that the weight ratio of the elastic/nonelastic resin was 25/75 and the spinning rate was 0.064 g per minute per hole for B-1 and 0.191 g per minute per hole for A-1. Properties of the fabric obtained are summarized in Table 1. This nonwoven fabric showed a good elasticity and antiblocking property, an adequate strength under elongation, and favorable feeling.

Example 10

An elastic nonwoven fabric was manufactured from the elastomeric resin B-2 and nonelastomeric resin A-1, melted by heating to 270° C. and 200° C., respectively. The gear pumps were set so that the weight ratio of the elastomeric/nonelastomeric resin was 80/20. The molten B-2 resin was discharged through the spinneret at a rate of 0.204 g per minute per hole, and the molten A-1 at 0.051 g per minute per hole. The threads formed were blown onto the conveyor, located at a distance of 25 cm from the spinneret and running at a rate of 2 m/min, by means of compressed air at 98 kPa (gauge) heated to 400° C. Properties of the fabric are summarized in Table 1. This nonwoven fabric showed a good elasticity and antiblocking property, an adequate strength under elongation, and favorable feeling.

Example 11

The elastic nonwoven fabric obtained in Example 10 was stretched 2.2 times in the machine direction at 23° C., relaxed and wound up into a roll. Properties of the stretched fabric are summarized in Table 2. This fabric showed a good elasticity and antiblocking property, an adequate strength under elongation, and particularly favorable feeling.

Example 12

An elastic nonwoven fabric was manufactured from the elastomeric resin B-1 and nonelastomeric resin A-2 in the same process as in Example 3. Properties of the fabric are summarized in Table 2. This fabric showed a good elasticity and antiblocking property, an adequate strength under elongation, and favorable feeling.

Example 13

The elastic nonwoven fabric obtained in Example 12 was stretched 2.2 times in the machine direction at 23° C., relaxed and wound up into a roll. Properties of the stretched fabric are summarized in Table 2. This fabric showed a good elasticity and antiblocking property, an adequate strength under elongation, and particularly favorable feeling.

Example 14

An elastic nonwoven fabric was manufactured from the elastomeric resin B-1 and nonelastomeric resin A-3 in the same process as in Example 3. Properties of the fabric are summarized in Table 2. This fabric showed a good elasticity and antiblocking property, an adequate strength under elongation, and favorable feeling.

Example 15

An elastic nonwoven fabric was manufactured from the elastomeric resin B-1 and nonelastomeric resin A-4 in the same process as in Example 3. Properties of the fabric are summarized in Table 2. This fabric showed a good elasticity and antiblocking property, an adequate strength under elongation, and favorable feeling.

Example 16

An elastic nonwoven fabric was manufactured from the elastomeric resin B-3 and nonelastomeric resin A-1 in the same process as in Example 3. Properties of the fabric are summarized in Table 2. This fabric showed a good elasticity and antiblocking property, an adequate strength under elongation, and favorable feeling.

Example 17

An elastic nonwoven fabric was manufactured from the elastomeric resin B-4 and nonelastomeric resin A-1 in the same process as in Example 3. Properties of the fabric are summarized in Table 2. This fabric showed a good elasticity and antiblocking property, an adequate strength under elongation, and favorable feeling.

Example 18

An elastic nonwoven fabric was manufactured from the elastomeric resin B-5 and nonelastomeric resin A-1 in the same process as in Example 3. Properties of the fabric are summarized in Table 2. This fabric showed a good elasticity and antiblocking property, an adequate strength under elongation, and favorable feeling.

Example 19

An elastic nonwoven fabric was manufactured from the elastomeric resin B-6 and nonelastomeric resin A-1 in the same process as in Example 3. Properties of the fabric are summarized in Table 2. This fabric showed a good elasticity and antiblocking property, an adequate strength under elongation, and favorable feeling.

Example 20

An elastic nonwoven fabric was manufactured from the elastomeric resin B-7 and nonelastomeric resin A-1 in the same process as in Example 3. Properties of the fabric are summarized in Table 2. This fabric showed a good elasticity and antiblocking property, an adequate strength under elongation, and favorable feeling.

Example 21

An elastic nonwoven fabric was manufactured from the elastomeric resin B-8 and nonelastomeric resin A-1 in the same process as in Example 3. Properties of the fabric are summarized in Table 3. This fabric showed a good elasticity and antiblocking property, an adequate strength under elongation, and favorable feeling.

Example 22

An elastic nonwoven fabric was manufactured from the elastomeric resin B-9 and nonelastomeric resin A-1 in the same process as in Example 3. Properties of the fabric are summarized in Table 3. This fabric showed a good elasticity and antiblocking property, an adequate strength under elongation, and favorable feeling.

Example 23

Short fiber 2 dtex in fineness and 5 mm in length was prepared from the nonelastomeric resin A-1 using an extruder equipped with a screw 30 mm in diameter, heating elements and a gear pump, a spinning apparatus comprising a spinneret (500 holes 0.6 mm in diameter), a godet roller and a take-up, and a hot-roller stretcher. A melt-blown nonwoven fabric was manufactured from the elastomeric resin B-1 in an apparatus comprising an extruder equipped with a screw 30 mm in diameter, heating elements and a gear pump, a spinneret (501 holes 0.3 mm in diameter, 500 mm in effective width), an air compressor, an air heater, a collecting conveyor with a polyester net, and a take-up. The elastomeric resin was charged in the extruder, melted by heating to 230° C., and discharged through the spinneret. The threads formed were blown onto the conveyor, located at a distance of 25 cm from the spinneret and running at a rate of 2 m/min, by means of compressed air at 98 kPa (gauge) heated to 400° C. The air was removed by a suction unit behind the conveyor.

The nonelastomeric short fiber prepared above was supplied into the melt-blowing air so that the weight ratio of long elastomeric fiber/short nonelastic fiber =80/20 and that the fibers are mixed uniformly. The load on the conveyor was point-bonded at 120° C. using an embossed roller with a pressurized area ratio of 24%, and finally rolled up as elastic nonwoven fabric with a basic weight of 60 g/m$^2$.

Properties of the fabric obtained are summarized in Table 3. This nonwoven fabric showed a good elasticity and antiblocking property, an adequate strength under elongation, and favorable feeling.

Example 24

An elastic nonwoven fabric was manufactured from the elastomeric resin B-1 and nonelastomeric resin A-1 in the same process as in Example 3, except that the nonelastomeric resin was melted by heating to 240° C. Properties of the fabric are summarized in Table 3. This fabric showed a good elasticity and antiblocking property, an adequate strength under elongation, and favorable feeling.

Example 25

An elastic nonwoven fabric was manufactured from the elastomeric resin B-1 and nonelastomeric resin A-1 in the same process as in Example 3, except that the nonelastomeric resin was melted by heating to 210° C. and the elastomeric resin to 240° C. Properties of the fabric are summarized in Table 3. This fabric showed a good elasticity and antiblocking property, an adequate strength under elongation, and favorable feeling.

Example 26

A spunbonded nonwoven fabric was manufactured from the elastomeric resin B-1 and nonelastomeric resin A-1 in an apparatus comprising two extruders equipped with a screw 40 mm in diameter, heating elements and a gear pump, spinnerets for combined yarns shown in FIG. 1 (120 holes 0.4 mm in diameter), an air sucker, an electrostatic opening machine, a collecting conveyor with a polyester net, a point-bonding machine, and a take-up. The elastomeric and nonelastomeric resins were charged in the respective extruders, and melted by heating to 230° C. and 270° C., respectively. The gear pumps were set so that the weight ratio of the elastomeric/nonelastomeric resin was 80/20. The molten B-1 resin was discharged through the spinneret at a rate of 0.46 g per minute per hole, and the molten A-1 at 0.11 g per minute per hole. The threads formed were introduced in the air sucker (196 kPa), and immediately opened by the electrostatic opening machine, before being finally collected by the conveyor. The web on the conveyor was then introduced into the point-bonding machine (a roller temperature of 90° C., contact area ratio of 15%), and the finished product was rolled up as elastic nonwoven fabric with a basic weight of 60 g/m$^2$. Properties of the fabric are summarized in Table 3. This nonwoven fabric showed a good elasticity and antiblocking property, an adequate strength under elongation, and favorable feeling.

Example 27

An elastic long-fibered nonwoven fabric was manufactured from the elastomeric resin B-5 and nonelastomeric resin A-1 in the same process as in Example 26, except that the nonelastomeric resin was melted by heating to 240° C. Properties of the fabric are summarized in Table 3. This fabric showed a good elasticity and antiblocking property, an adequate strength under elongation, and favorable feeling.

Example 28

The elastic nonwoven fabric obtained in Example 26 was stretched 2.2 times in the machine direction at 23° C., relaxed and wound up into a roll. Properties of the stretched fabric are summarized in Table 3. This fabric showed a good elasticity and antiblocking property, an adequate strength under elongation, and particularly favorable feeling.

Example 29

The elastic nonwoven fabric obtained in Example 27 was stretched 2.2 times in the machine direction at 23° C., relaxed and wound up into a roll. Properties of the stretched fabric are summarized in Table 3. This fabric showed a good elasticity and antiblocking property, an adequate strength under elongation, and particularly favorable feeling.

Comparative Example 1

An elastic nonwoven fabric was manufactured from the elastomeric resin B-1 and nonelastomeric resin A-1 as in Example 1, except that the weight ratio of the elastic/nonelastic resin was 99/1, the spinning rate was 0.252 g per minute per hole for B-1 and 0.003 g per minute per hole for A-1, and the conveyor speed was 2 m/min. Properties of the fabric obtained are summarized in Table 4. This fabric showed unsatisfactory performance with the peeling strength higher than the strength under elongation.

Comparative Example 2

An elastic nonwoven fabric was manufactured from the elastomeric resin B-1 and nonelastomeric resin A-1 as in Example 1, except that the two resins were blended at a ratio of B-1/A-1=90/10 on the weight basis before being fed to the extruder, and that the spinning rate for the mixture was 0.26 g per minute per hole. Properties of the fabric obtained are summarized in Table 4. This fabric showed unsatisfactory performance with the peeling strength higher than the strength under elongation.

Comparative Example 3

An elastic nonwoven fabric was manufactured from the elastomeric resin B-1 only under processing conditions and in an apparatus similar to those in Exapmle 2. Properties of the fabric obtained are summarized in Table 4. This fabric showed unsatisfactory performance with the peeling strength higher than the strength under elongation.

Comparative Example 4

An elastic nonwoven fabric was manufactured from the elastomeric resin B-1 and nonelastomeric resin A-1 as in Example 1, except that the weight ratio of the elastic/nonelastic resin was 40/60, and the spinning rate was 0.102 g per minute per hole for B-1 and 0.153 g per minute per hole for A-1. Properties of the fabric obtained are summarized in Table 4. This fabric showed unsatisfactory performance with too low an elastic recovery rate of 50% elongation.

Comparative Example 5

An elastic nonwoven fabric was manufactured from the elastomeric resin B-1 and nonelastomeric resin A-1 as in Example 1, except that the two resins were blended at a ratio of B-1/A-1=50/50 on the weight basis before being fed to the extruder, and that the spinning rate for the mixture was 0.26 g per minute per hole. Properties of the fabric obtained are summarized in Table 4. This fabric consisting of an equal amount of the elastic and nonelastic resins showed unsatisfactory performance with too low an elastic recovery rate of 50% elongation.

Comparative Example 6

An elastic nonwoven fabric was manufactured from the elastomeric resin B-10 and nonelastomeric resin A-1 as in Example 26, except that the weight ratio of the elastic/nonelastic resin was 30/70, and the spinning rate was 0.17 g per minute per hole for B-1 and 0.40 g per minute per hole for A-1. Properties of the fabric obtained are summarized in Table 4. This fabric showed unsatisfactory performance with too low an elastic recovery rate of 50% elongation.

Comparative Example 7

A melt-blown nonwoven fabric was manufactured from the elastomeric resin B-10 and nonelastomeric resin A-1 in an apparatus comprising two extruders equipped with a screw 30 mm in diameter, heating elements and a gear pump, side-by-side spinnerets for combined yarns (501 holes 0.3 mm in diameter, 500 mm in effective width), an air compressor, an air heater, a collecting conveyor with a polyester net, and a take-up. The elastomeric and nonelastomeric resins were charged in the respective extruders, and melted by heating to 230° C. and 270° C., respectively. The gear pumps were set so that the weight ratio of the elastomeric/nonelastomeric resin was 80/20. The molten resins were discharged through the spinneret at a rate of 0.12 g per minute per hole. The threads formed were blown onto the conveyor, located at a distance of 25 cm from the spinneret, with the polyester net running at a rate of 1.5 m/min, by means of compressed air at 98 kPa (gauge) heated to 400° C. The air was removed by a suction unit behind the conveyor. The load on the conveyor was rolled up as elastic nonwoven fabric with a basic weight of 61 g/m$^2$. Properties of the fabric are summarized in Table 4. The nonwoven fabric thus obtained, composed of composite fiber yarns, showed unsatisfactory performance with the peeling strength higher than the strength under elongation. In fact, the product was irreversibly elongated when unwound from the roll and was unusable.

Table 1
Table 2
Table 3
Table 4

Effect of the Invention

The elastic nonwoven fabric or laminated elastic nonwoven fabric according to the present invention is favorably applicable in disposable diapers, clothes, caps, bandages, tapes and other fiber products that need comfortable fit to the body, has adequate elasticity and flexibility, owing to its good elasticity and antiblocking property as well as adequate strength under elongation. Appropriate selection of the elastomeric and nonelastomeric resins allows manufacture of elastic nonwoven fabric or laminated elastic nonwoven fabric with favorable elasticity and antiblocking property, adequate strength under elongation, and favorable feeling while generating no toxic gases on combustion and being recyclable.

TABLE 1

Figure 1:
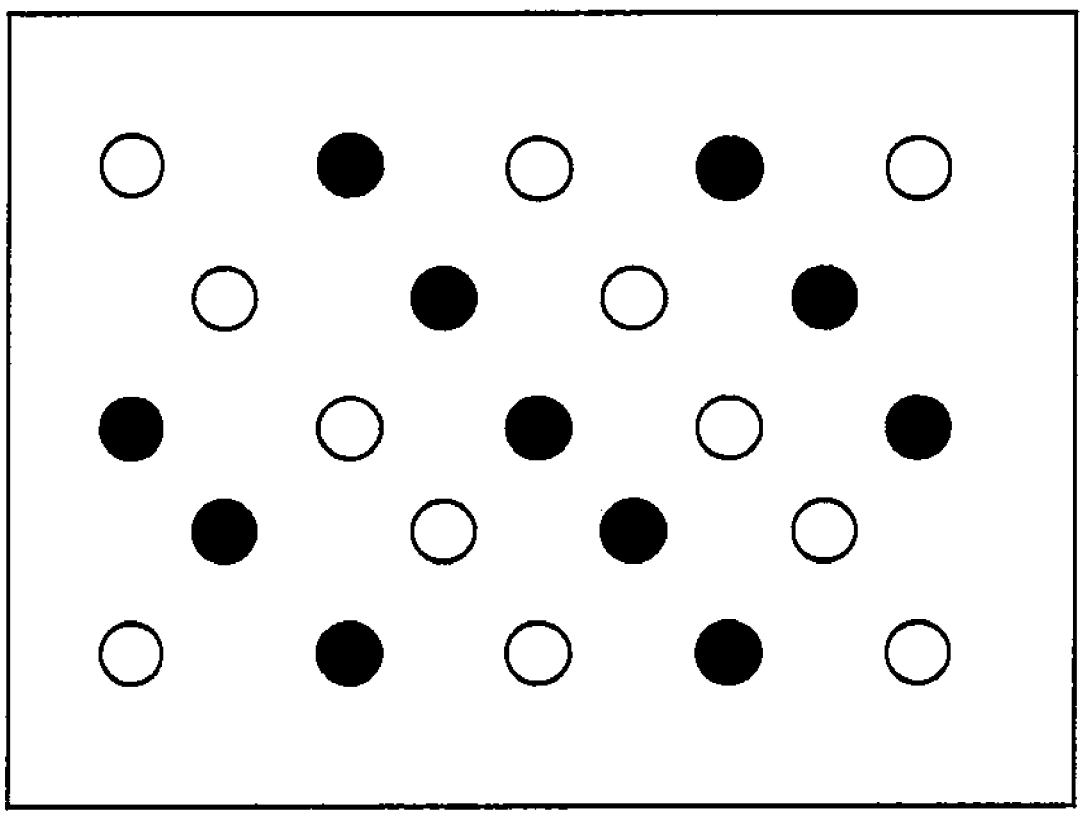
FIG. 1 shows an example of the arrangement of the spinning holes in a spinneret for manufacture of spunbonded nonwoven fabric according to the invention. The white circle represents a spinning hole for the elastomeric resin, and the black circle that for the nonelasotmeric resin.

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Elastomeric resin | Resin No. | | B-1 | B-1 | B-1 | B-1 | B-1 | B-1 | B-1 | B-1 | B-1 | B-2 |
| Nonelastomeric resin | Resin No. | | A-1 | A-1 | A-1 | A-1 | A-1 | A-1 | A-1 | A-1 | A-1 | A-1 |
| Elastomer/nonelastomer weight ratio | | | 95/5 | 90/10 | 80/20 | 80/20 | 70/30 | 60/40 | 50/50 | 85/15 | 75/25 | 80/20 |
| Manufacture of nonwoven fabric | Manufacturing method* | | MB | MB | MB | MB | MB | MB | MB | MB | MB | MB |
| | Stretching ratio | | 0 | 0 | 0 | 2.2 | 0 | 0 | 0 | 0 | 0 | 0 |
| Property of nonwoven fabric | Elastomer fiber average diameter | μm | 12.0 | 11.5 | 9.1 | 9.1 | 9.0 | 9.0 | 9.0 | 9.3 | 8.5 | 2.0 |
| | Nonelastomer fiber average diameter | μm | 1.0 | 1.1 | 1.2 | 1.2 | 1.2 | 1.5 | 1.7 | 1.2 | 1.3 | 8.0 |
| | Elongation recovery rate of 50% elongation | % | 100 | 98 | 98 | 98 | 87 | 84 | 82 | 98 | 92 | 75 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Strength at 50% elongation | N/25 mm | 2.1 | 2.3 | 2.7 | 1.0 | 4.8 | 6.7 | 8.0 | 2.4 | 3.4 | 4.7 |
| Peeling strength | N/25 mm | 2 | 2 | 1 | 0.8 | 0.5 | 0.3 | 0 | 1 | 1 | 3 |
| Feeling |  | 80 | 85 | 90 | 95 | 94 | 95 | 95 | 89 | 92 | 65 |
| Basic weight | g/m² | 60 | 62 | 62 | 60 | 60 | 61 | 60 | 59 | 57 | 62 |

*MB = Melt blowing SB = Spun-bonding

TABLE 2

|  |  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Elastomeric resin | Resin No. |  | B-2 | B-1 | B-1 | B-1 | B-1 | B-3 | B-4 | B-5 | B-6 | B-7 |
| Nonelastomeric resin | Resin No. |  | A-1 | A-2 | A-2 | A-3 | A-4 | A-1 | A-1 | A-1 | A-1 | A-1 |
| Elastomer/nonelastomer weight ratio |  |  | 80/20 | 80/20 | 80/20 | 80/20 | 80/20 | 80/20 | 80/20 | 80/20 | 80/20 | 80/20 |
| Manufacture of nonwoven fabric | Manufacturing method* |  | MB | MB | MB | MB | MB | MB | MB | MB | MB | MB |
|  | Stretching ratio |  | 2.2 | 0 | 2.2 | 0 | 0 | 0 | 0 | 0 | 0 | 0 |
| Property of nonwoven fabric | Elastomer fiber average diameter | μm | 2.0 | 9.1 | 9.1 | 9.1 | 9.1 | 12.0 | 8.0 | 7.5 | 8.0 | 27.0 |
|  | Nonelastomer fiber average diameter | μm | 8.0 | 1.5 | 1.5 | 1.6 | 1.2 | 1.3 | 1.3 | 1.2 | 1.1 | 1.4 |
|  | Elongation recovery rate of 50% elongation | % | 75 | 98 | 98 | 98 | 98 | 90 | 92 | 83 | 86 | 98 |
|  | Strength at 50% elongation | N/25 mm | 1.0 | 2.9 | 1.0 | 2.2 | 3.5 | 9.0 | 3.0 | 3.0 | 3.1 | 11.0 |
|  | Peeling strength | N/25 mm | 0.8 | 1 | 0.8 | 1 | 1 | 1 | 1 | 1 | 1 | 1 |
|  | Feeling |  | 70 | 85 | 90 | 88 | 82 | 85 | 87 | 84 | 82 | 67 |
|  | Basic weight | g/m² | 60 | 62 | 60 | 63 | 64 | 58 | 60 | 60 | 60 | 62 |

*MB = Melt blowing SB = Spun-bonding

TABLE 3

|  |  |  | Example 21 | Example 22 | Example 23 | Example 24 | Example 25 | Example 26 | Example 27 | Example 28 | Example 29 |
|---|---|---|---|---|---|---|---|---|---|---|---|
| Elastomeric resin | Resin No. |  | B-8 | B-9 | B-1 | B-1 | B-1 | B-1 | B-5 | B-1 | B-5 |
| Nonelastomeric resin | Resin No. |  | A-1 | A-1 | A-1 | A-1 | A-1 | A-1 | A-1 | A-1 | A-1 |
| Elastomer/nonelastomer weight ratio |  |  | 80/20 | 80/20 | 80/20 | 80/20 | 80/20 | 80/20 | 80/20 | 80/20 | 80/20 |
| Manufacture of nonwoven fabric | Manufacturing method* |  | MB | MB | MB | MB | MB | SB | SB | SB | SB |
|  | Stretching ratio |  | 0 | 0 | 0 | 0 | 0 | 0 | 0 | 2.2 | 2.2 |
| Property of nonwoven fabric | Elastomer fiber average diameter | μm | 8.5 | 9.0 | 12.5 | 9.0 | 15.0 | 25.0 | 27.0 | 25.0 | 27.0 |
|  | Nonelastomer fiber average diameter | μm | 1.5 | 1.7 | 18.0 | 5.0 | 5.0 | 18.0 | 18.0 | 18.0 | 18.0 |
|  | Ellongation recovery rate of 50% elongation | % | 83 | 82 | 90 | 90 | 90 | 90 | 90 | 92 | 92 |
|  | Strength at 50% elongation | N/25 mm | 5.0 | 5.5 | 3.5 | 3.4 | 4.0 | 3.0 | 4.5 | 1.0 | 1.0 |
|  | Peeling strength | N/25 mm | 1 | 1 | 2.8 | 2.7 | 2.5 | 1 | 1 | 0.8 | 0.8 |
|  | Feeling |  | 75 | 75 | 66 | 68 | 69 | 75 | 75 | 80 | 80 |
|  | Basic weight | g/m² | 61 | 61 | 60 | 58 | 60 | 60 | 60 | 58 | 58 |

*MB = Melt blowing SB = Spun-bonding

TABLE 4

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Elastomeric resin | Resin No. |  | B-1 | B-1 | B-1 | B-1 | B-1 | B-10 | B-10 |
| Nonelastomeric resin | Resin No. |  | A-1 | A-1 | no | A-1 | A-1 | A-1 | A-1 |
| Elastomer/nonelastomer weight ratio |  |  | 99/1 | 90/10Blend | 100/0 | 40/60 | 50/50Blend | 30/70 | 90/10 |
| Manufacture of nonwoven fabric | Manufacturing method* |  | MB | MB | MB | MB | MB | SB | MB |
|  | Stretching ratio |  | 0 | 0 | 0 | 0 | 0 | 0 | 0 |
| Property of nonwoven fabric | Elastomer fiber average diameter | μm | 16.0 | 7.0 | 16.0 | 7.0 | 6.5 | 15.0 | 10.0 |
|  | Nonelastomer fiber average diameter | μm | 0.2 | 7.0 | — | 3.0 | 6.5 | 20.0 |  |
|  | Elongation recovery rate of 50% elongation | % | 100 | 97 | 100 | 68 | 65 | 60 | 98 |
|  | Strength at 50% elongation | N/25 mm | 2.2 | 2.2 | 1.5 | 8.7 | 8.7 | 9.0 | 2.3 |
|  | Peeling strength | N/25 mm | 3.5 | 3.5 | 4 | 0 | 0 | 0 | 2.7 |
|  | Feeling |  | 65 | 67 | 50 | 80 | 80 | 80 | 80 |
|  | Basic weight | g/m² | 59 | 62 | 61 | 60 | 62 | 60 | 60 |

*MB = Melt blowing SB = Spun-bonding

What is claimed is:

1. An elastic nonwoven fabric consisting of one layer wherein a long elastomeric fiber and a long nonelastomeric fiber are uniformly mixed together by spinning with a spun-bonding method,
wherein the elastic nonwoven fabric has not been stretched after being manufactured, a ratio of said long elastomeric fiber and said long nonelastomeric fiber ranges from 50/50 to 95/5 on a weight basis, said long elastomeric fiber has an average diameter (Bd) of 5 to 40 μm, said long nonelastomeric fiber has an average diameter (Ad) of 1 to 20 μm, an elongation recovery rate of the elastic nonwoven fabric after 50% elongation is 70% or higher, a separation resistance of two sheets of the same is equal or less than the strength at 50% elongation, and a ratio of Bd to Ad is no less than one (Bd/Ad≧1).

2. An elastic nonwoven fabric obtained by stretching an elastic nonwoven fabric as described in claim 1.

3. An elastic nonwoven fabric according to claim 1, wherein the said long elastomeric fiber comprises at least one of the group consisting of elastomeric polystyrenes and elastomeric polyolefins.

4. A laminated elastic nonwoven fabric manufactured by laminating at least one item chosen from the group consisting of a nonwoven fabric different from one according to claim 1, film, web, textile, knit and fiber bundle, to an elastic nonwoven fabric according to claim 1.

5. A fiber product which employs the elastic nonwoven fabric according to claim 1.

6. A fiber product which employs the laminated elastic nonwoven fabric according to claim 4.

7. A laminated elastic nonwoven fabric manufactured by laminating at least one item chosen from the group consisting of a nonwoven fabric different from one according to claim 2, film, web, textile, knit and fiber bundle, to an elastic nonwoven fabric according to claim 2.

8. A fiber product which employs the elastic nonwoven fabric according to claim 2.

9. A fiber product which employs the laminated elastic nonwoven fabric according to claim 7.

10. An elastic nonwoven fabric according to claim 1, wherein in the spunbonding method, the long elastomeric fiber and the long nonelastomeric fiber are spun by using a spinneret having a plurality of first spinning holes for discharging elastomeric resin and a plurality of second spinning holes for discharging nonelastomeric resin thereon, the first spinning holes and the second spinning holes are arranged in a staggered manner, the spun fibers are introduced in an air sucker and then opened by using an electrostatic opening machine, and the opened fibers are collected on a conveyor.

11. A method for producing the elastic nonwoven fabric of claim 1, comprising:
   spinning the elastomeric fiber and the nonelastomeric fiber by using a spinneret having a plurality of first spinning holes for discharging elastomeric resin and a plurality of second spinning holes for discharging nonelastomeric resin thereon, wherein the first spinning holes and the second spinning holes are arranged in a staggered manner;
   introducing the spun fibers in an air sucker and then opening the fibers by using an electrostatic opening machine; and
   collecting the opened fibers on a conveyor.

* * * * *